United States Patent
Layden et al.

(10) Patent No.: US 10,589,633 B2
(45) Date of Patent: Mar. 17, 2020

(54) FAST CHARGING BATTERY SYSTEM

(71) Applicant: FORD GLOBAL TECHNOLOGIES, LLC, Dearborn, MI (US)

(72) Inventors: Kevin Layden, Plymouth, MI (US); John Paul Gibeau, Canton, MI (US); Kendrick J. Taylor, Canton, MI (US); Yuling Zhao, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 386 days.

(21) Appl. No.: 15/195,042

(22) Filed: Jun. 28, 2016

(65) Prior Publication Data
US 2017/0368949 A1 Dec. 28, 2017

(51) Int. Cl.
| | |
|---|---|
| *B60L 11/18* | (2006.01) |
| *B60L 53/31* | (2019.01) |
| *B60L 53/10* | (2019.01) |
| *B60L 53/14* | (2019.01) |
| *B60L 53/53* | (2019.01) |
| *B60L 53/18* | (2019.01) |
| *B60L 53/20* | (2019.01) |

(52) U.S. Cl.
CPC .......... *B60L 11/185* (2013.01); *B60L 53/11* (2019.02); *B60L 53/14* (2019.02); *B60L 53/18* (2019.02); *B60L 53/20* (2019.02); *B60L 53/31* (2019.02); *B60L 53/53* (2019.02); *B60L 2210/30* (2013.01); *Y02T 10/7005* (2013.01); *Y02T 10/7088* (2013.01); *Y02T 90/121* (2013.01); *Y02T 90/127* (2013.01); *Y02T 90/128* (2013.01); *Y02T 90/14* (2013.01)

(58) Field of Classification Search
USPC ........................................................ 320/109
See application file for complete search history.

(56) References Cited

U.S. PATENT DOCUMENTS

| | | | |
|---|---|---|---|
| 8,587,253 B2 | 11/2013 | Dyer et al. | |
| 8,754,614 B2 | 6/2014 | Paryani et al. | |
| 2005/0046387 A1 | 3/2005 | Aker et al. | |
| 2012/0249065 A1* | 10/2012 | Bissonette | B60L 11/184 320/109 |
| 2013/0020993 A1* | 1/2013 | Taddeo | H02J 7/0027 320/109 |
| 2013/0113413 A1* | 5/2013 | Harty | H01M 10/465 320/101 |
| 2014/0121866 A1 | 5/2014 | Dangler et al. | |
| 2015/0162784 A1* | 6/2015 | Kydd | B60L 11/1811 307/9.1 |

FOREIGN PATENT DOCUMENTS

| | | |
|---|---|---|
| JP | 2012228034 A | 11/2012 |
| WO | 2015/103164 A1 | 7/2015 |

OTHER PUBLICATIONS

"BMW introduces in-home, fast charging device," Smart Grid Today, Jul. 29, 2014, two pages.

* cited by examiner

*Primary Examiner* — Robert Grant
(74) *Attorney, Agent, or Firm* — David B. Kelley; Carlson, Gaskey & Olds

(57) ABSTRACT

A battery system includes a housing, a battery array inside the housing, a first wiring path that bypasses the battery array, and a second wiring path electrically connected to the battery array. The battery system is adapted to charge a battery pack of an electrified vehicle using AC power, DC power, or both.

20 Claims, 6 Drawing Sheets

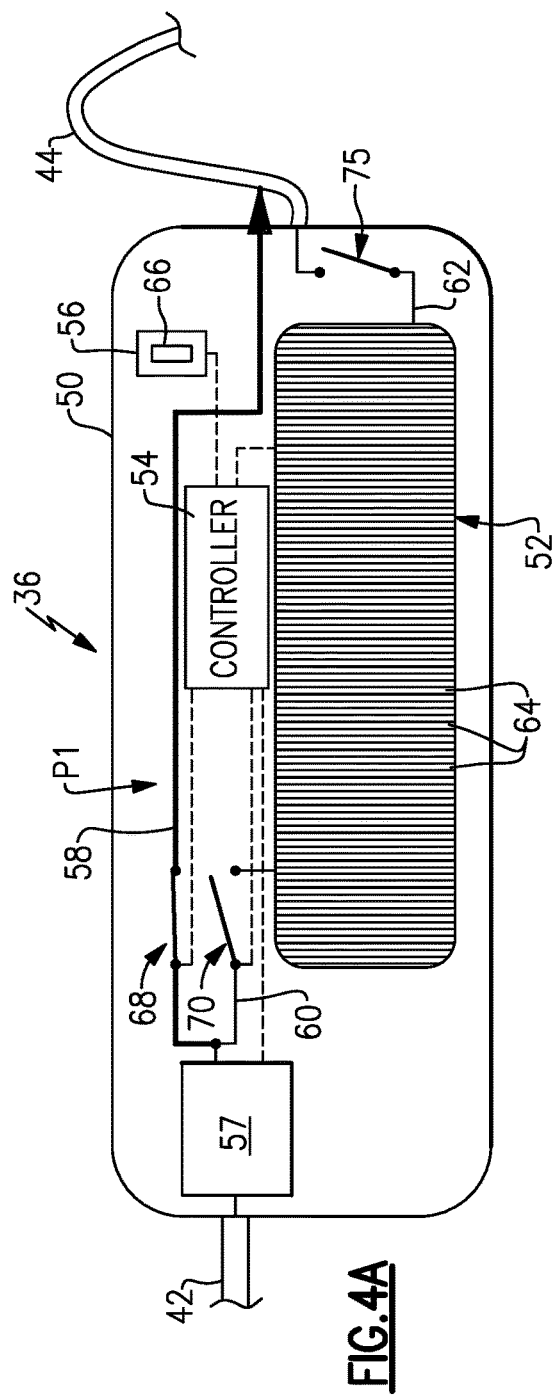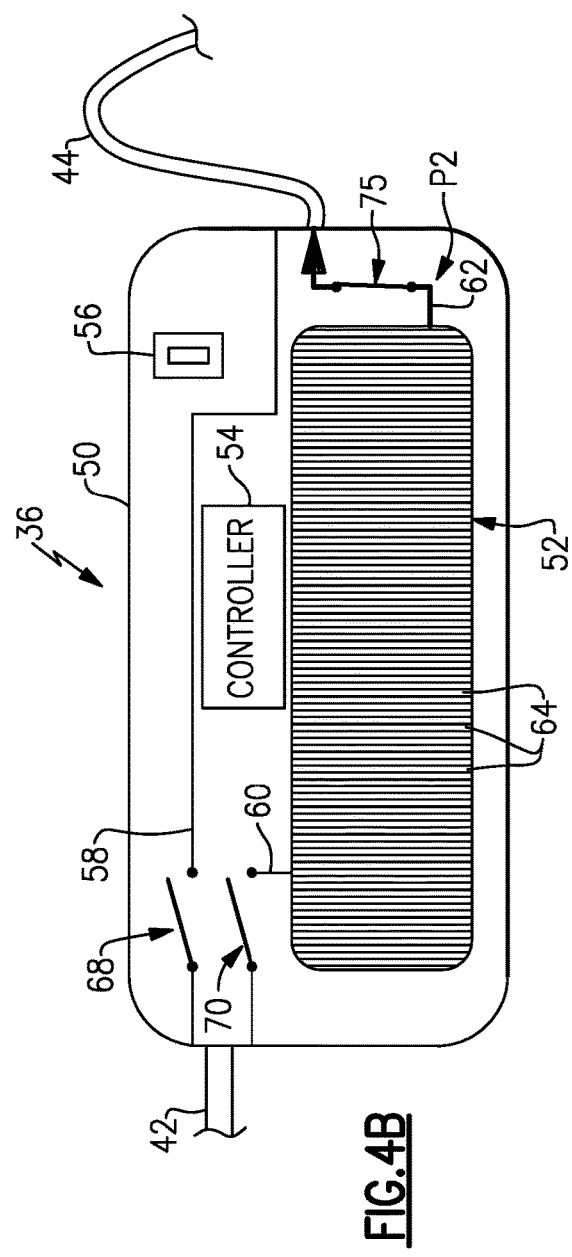

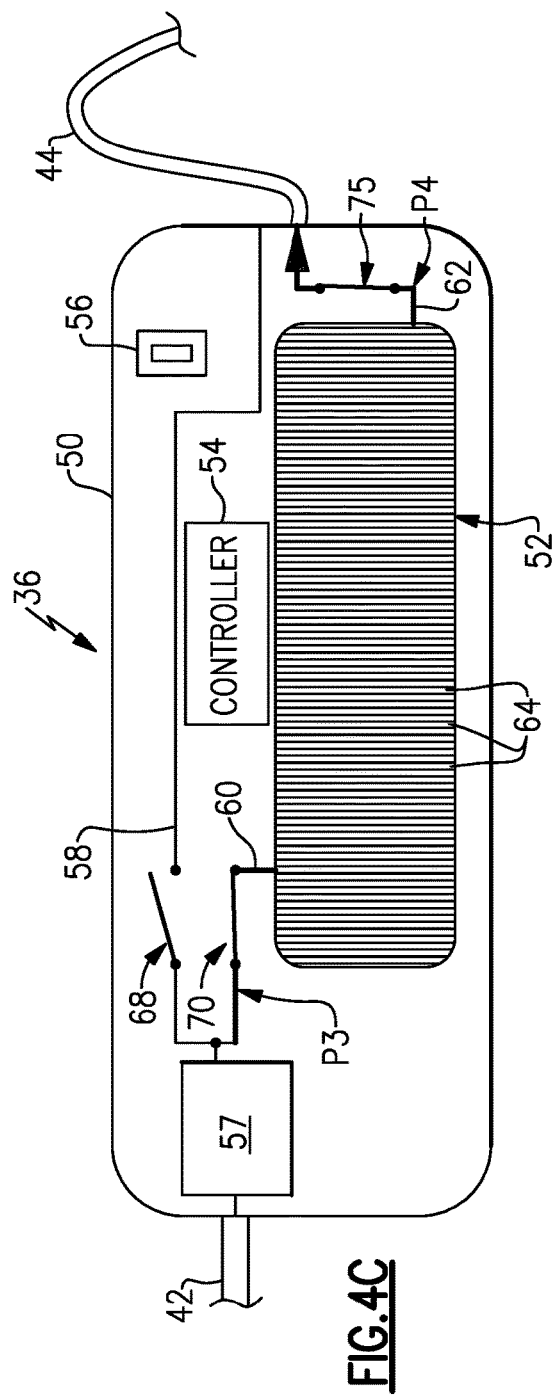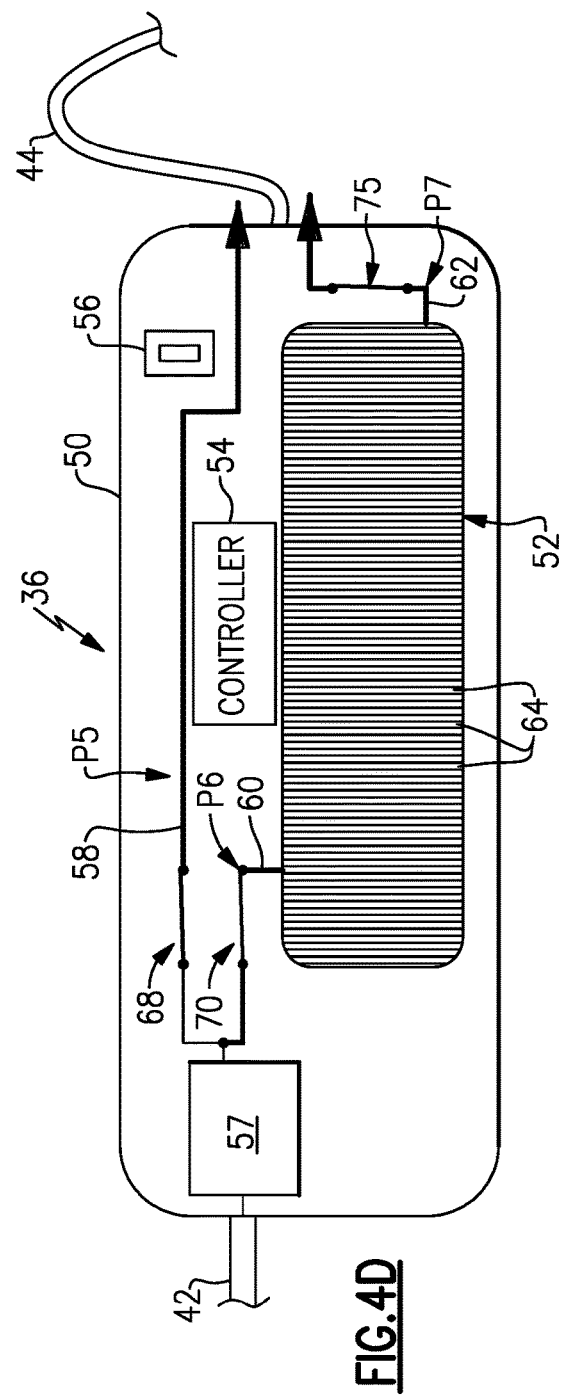

FAST CHARGING BATTERY SYSTEM

TECHNICAL FIELD

This disclosure relates to a battery system for charging battery packs of electrified vehicles. The charging system includes a battery array for storing energy. The stored energy can be supplied to the battery pack of the electrified vehicle for DC fast charging the battery pack.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack typically powers the electric machines and other electrical loads of the electrified vehicle. The battery pack includes a plurality of battery cells that must be periodically recharged to replenish the energy necessary to power these loads. Many electrified vehicle customers desire residential battery systems capable of quickly, efficiently, and inexpensively charging the battery pack.

SUMMARY

A battery system according to an exemplary aspect of the present disclosure includes, among other things, a housing, a battery array inside the housing, a first wiring path that bypasses the battery array, and a second wiring path electrically connected to the battery array.

In a further non-limiting embodiment of the foregoing battery system, a third wiring path extends between the battery array and a power cable of the battery system.

In a further non-limiting embodiment of either of the foregoing battery systems, the first wiring path establishes a direct path for transferring AC power for charging a battery pack of an electrified vehicle, the second wiring path establishes a direct path for transferring DC power for charging the battery array, and the third wiring path establishes a direct path for transferring DC power for charging the battery pack.

In a further non-limiting embodiment of any of the foregoing battery systems, a transformer/converter is configured to convert AC power from a grid power source to DC power for charging a plurality of battery cells of the battery array.

In a further non-limiting embodiment of any of the foregoing battery systems, a setting switch has an actuator movable to select from a plurality of charging operating modes of the battery system.

In a further non-limiting embodiment of any of the foregoing battery systems, the plurality of charging operating modes include an AC charging operating mode, a DC fast charging operating mode, and a combined AC/DC charging operating mode.

In a further non-limiting embodiment of any of the foregoing battery systems, a first contactor is disposed in the first wiring path and a second contactor disposed in the second wiring path.

In a further non-limiting embodiment of any of the foregoing battery systems, a controller is configured to control operation of the battery system.

In a further non-limiting embodiment of any of the foregoing battery systems, the controller is configured to selectively command DC power to be sent to the battery array over the second wiring path.

In a further non-limiting embodiment of any of the foregoing battery systems, the controller is configured to close a contactor to send the DC power to the battery array over the second wiring path.

In a further non-limiting embodiment of any of the foregoing battery systems, a first power cable and a second power cable extend to the outside of the housing.

In a further non-limiting embodiment of any of the foregoing battery systems, the battery array includes a plurality of battery cells that store energy for charging a battery pack separate from the battery system.

A method according to another exemplary aspect of the present disclosure includes, among other things, charging a battery pack of an electrified vehicle with a battery system, the battery system adapted to charge the battery pack using AC power, DC power, or both.

In a further non-limiting embodiment of the foregoing methods, the method includes connecting the battery system to a grid power source, storing energy within a battery array of the battery system, and using the energy stored in the battery array to charge the battery pack.

In a further non-limiting embodiment of either of the foregoing methods, the method includes selecting a charging operating mode for charging the battery pack with the battery system.

In a further non-limiting embodiment of any of the foregoing methods, if an AC charging operating mode of the battery system has been selected, the method includes charging the battery pack using only AC power.

In a further non-limiting embodiment of any of the foregoing methods, if a DC fast charging operating mode of the battery system has been selected, the method includes charging the battery pack using only DC power.

In a further non-limiting embodiment of any of the foregoing methods, the method includes simultaneously charging battery cells of a battery array of the battery system.

In a further non-limiting embodiment of any of the foregoing methods, if a combined AC/DC charging operating mode of the battery system has been selected, the method includes charging the battery pack using both AC power and DC power.

In a further non-limiting embodiment of any of the foregoing methods, the method includes simultaneously charging battery cells of a battery array of the battery system.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIGS. 4A, 4B, 4C, and 4D schematically illustrate various operating modes of the battery system of FIG. 3.

DETAILED DESCRIPTION

This disclosure details an exemplary battery system for charging electrified vehicle battery packs. The battery system includes a battery array and multiple wiring paths housed inside a housing. Energy may be stored within the battery array for subsequently charging a battery pack. The battery system may be operated in various operating modes for charging the battery pack using either alternating current (AC) power, direct current (DC) power, or a combination of AC and DC power. The battery system is an at-home, multi-use charger that provides users with the ability to store energy at home (i.e., within the battery array) for quickly, efficiently, and cost-effectively fast charging the battery pack of the electrified vehicle. The battery system also provides users the ability to select from multiple charging protocols without requiring complex home electrical infrastructure changes. These and other features are discussed in greater detail in the following paragraphs of this detailed description.

Figure 1:
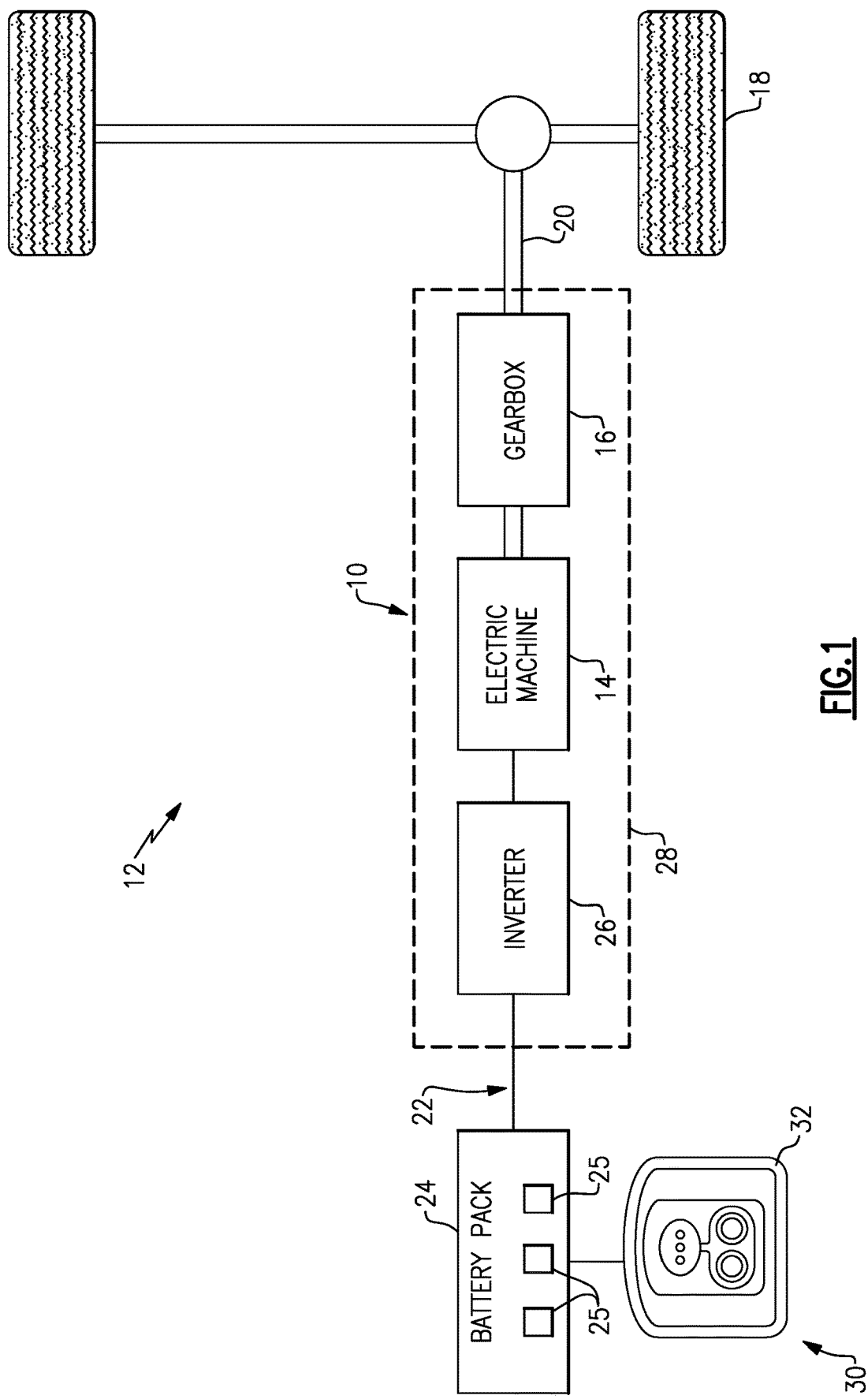
FIG. 1 schematically illustrates a powertrain of an electrified vehicle.

FIG. 1 schematically illustrates a powertrain 10 of an electrified vehicle 12. Although depicted as a battery electric vehicle (BEV), it should be understood that the concepts described herein are not limited to BEV's and could extend to other electrified vehicles, including but not limited to, plug-in hybrid electric vehicles (PHEV's). Therefore, although not shown in this embodiment, the electrified vehicle 12 could be equipped with an internal combustion engine that can be employed either alone or in combination with other energy sources to propel the electrified vehicle 12.

In a non-limiting embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, the gearbox 16, and the inverter 26 may collectively be referred to as a transmission 28.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 may also include a charging system 30 for periodically charging the energy storage devices (e.g., battery cells) of the battery pack 24. The charging system 30 may be connected to an external power source (not shown) for receiving and distributing power to the energy storage devices. For example, in one non-limiting embodiment, the charging system 30 includes a charging port 32 located on-board the electrified vehicle 12. The charging port 32 is adapted to selectively receive power from the external power source, such as from a power cable connected to the external power source, and then distribute the power to the battery pack 24 for charging the energy storage devices.

The charging system 30 may also be equipped with power electronics used to convert AC power received from the external power supply to DC power for charging the energy storage devices of the battery pack 24. The charging system 30 may also accommodate one or more conventional voltage sources from the external power supply (e.g., 110 volt, 220 volt, etc.).

The powertrain 10 shown in FIG. 1 is highly schematic and is not intended to limit this disclosure. Various additional components could alternatively or additionally be employed by the powertrain 10 within the scope of this disclosure.

Figure 2:
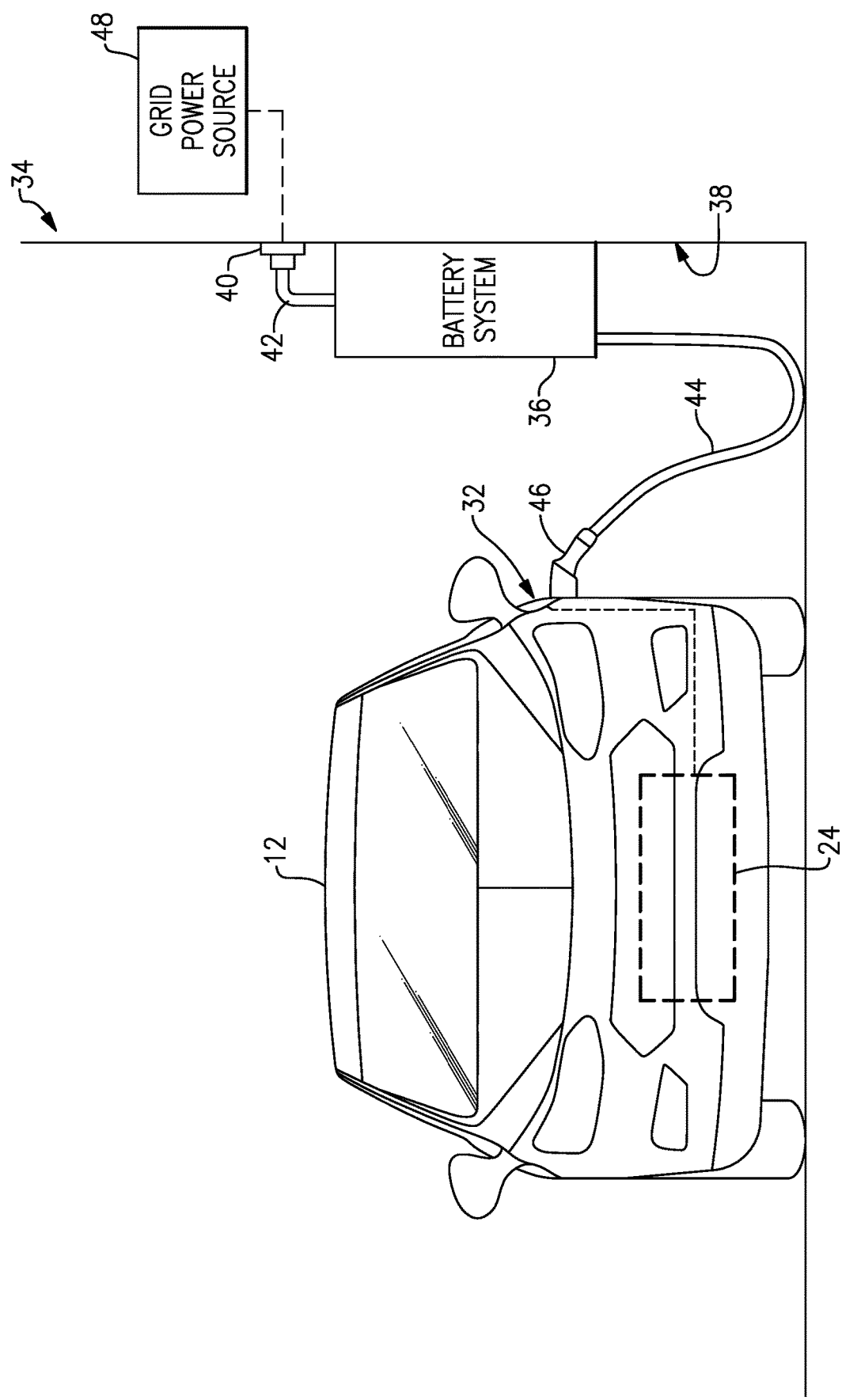
FIG. 2 shows an electrified vehicle incorporating the powertrain of FIG. 1 and located in a charging position relative to a battery system.

FIG. 2 schematically depicts the electrified vehicle 12 of FIG. 1 parked in a charging position near a structure 34. The structure 34 could be a residential building, a commercial building, a parking garage, or any other structure. In a non-limiting embodiment, the structure 34 is a garage located at the home of the owner/operator of the electrified vehicle 12. It should be understood that the various components of FIG. 2 are shown schematically to better illustrate the features of this disclosure and are not necessarily depicted to scale.

A battery system 36 for charging the battery pack 24 of the electrified vehicle 12 may be mounted to a surface 38, such as a wall or a floor, of the structure 34. The battery system 36 may be electrically coupled to a power outlet 40 by a first power cable 42. A second power cable 44 extends between the battery system 36 and the charging port 32 of the electrified vehicle 12. A vehicle coupler 46 of the second power cable 44 is coupled to the charging port 32 to allow power to be transferred from the battery system 36 to the electrified vehicle 12, and more specifically to the battery pack 24 of the electrified vehicle 12.

A grid power source 48 can supply power to the battery system 36 once the first power cable 42 is connected to the power outlet 40. In a non-limiting embodiment, the grid power source 48 is an AC power source that inputs power to the battery system 36 at either 110 volts or 220 volts. The power supplied to the battery system 36 may be stored therein and then selectively used to charge the battery pack 24 of the electrified vehicle 12. Thus, the battery system 36 can be used to charge the battery pack 24 of the electrified vehicle 12 even when power is not available from the grid power source 48.

Figure 3:
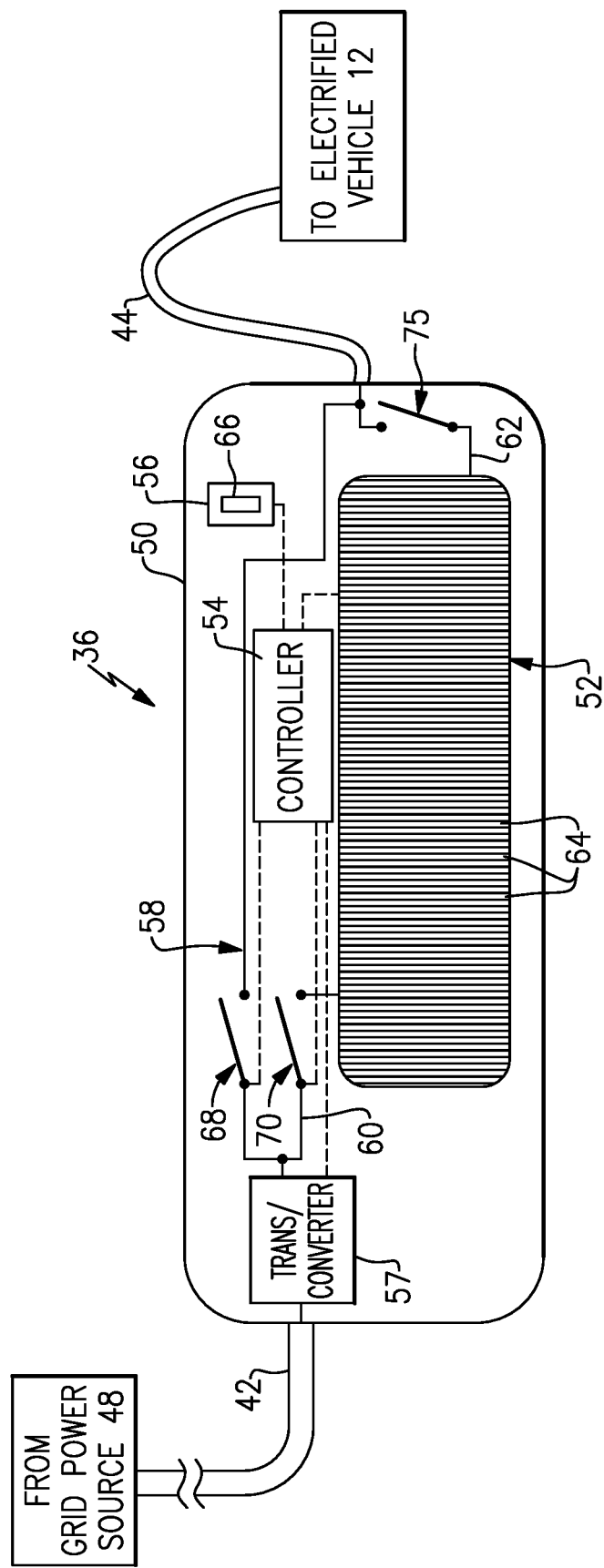
FIG. 3 illustrates a battery system for charging a battery pack of an electrified vehicle.

The battery system 36 is illustrated in greater detail in FIG. 3. The battery system 36 may include a housing 50, a battery array 52, a controller 54, a setting switch 56, a transformer/converter 57, and multiple wiring paths 58, 60, 62. The battery system 36 receives AC power through the first power cable 42 (i.e., assuming a connection to the grid power source 48) and can deliver either AC power, DC power, or both to the electrified vehicle 12 via the wiring paths 58, 60, 62 and the second power cable 44.

The housing 50 is an enclosure that houses the components of the battery system 36, including but not limited to the battery array 52, the controller 54, the transformer/converter 57, the wiring paths 58, 60, 62, etc. In a non-limiting embodiment, the housing 50 is a sealed enclosure. Although not shown, the housing 50 could include one or more access doors for accessing the internal components of the battery system 36, such as for performing maintenance or repair related tasks.

The battery array 52 of the battery system 36 includes a plurality of battery cells 64 or other energy storage devices capable of storing electrical power that is received when the battery system 36 is electrically connected to the grid power source 48. The energy stored in the battery cells 64 can be used to charge the battery pack 24 of the electrified vehicle 12. Although a specific number of battery cells 64 are depicted in FIG. 3, the battery array 52 could employ a greater or fewer number of battery cells within the scope of this disclosure. The battery cells 64 may be stacked side-by-side and then coupled together using various structures (e.g., spacers, rails, walls, plates, bindings, bus bars, etc.) to construct the battery array 52. A single battery array 52 is shown in FIG. 3; however, the battery system 36 could include a greater or fewer number of battery arrays within the scope of this disclosure.

In a non-limiting embodiment, the battery cells 64 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The setting switch 56 allows users to select a desired charging protocol for charging the battery pack 24 of the electrified vehicle 12 with the battery system 36. In a non-limiting embodiment, the setting switch 56 includes an actuator 66, such as a toggle, button, knob, etc., that can be accessed at the exterior of the housing 50 and then moved to select the desired charging protocol or operating mode of the battery system 36.

The wiring paths 58, 60, and 62 transfer the power received from the grid power source 48 through the battery system 36. Each wiring path 58, 60, 62 may include one or more wires or other power transfer conduits for transferring power through the battery system 36.

In a non-limiting embodiment, the wiring path 58 is configured to transfer AC power received from the first power cable 42 directly to the second power cable 44. The wiring path 58 thus completely bypasses the battery array 52 and delivers AC power directly to the electrified vehicle 12 for charging the battery pack 24.

The wiring path 60 is configured to transfer power directly to the battery array 52. The wiring path 60 is thus electrically connected to the battery array 52 for charging the battery cells 64.

Finally, the wiring path 62 is configured to transfer DC power directly from the battery array 52 to the second power cable 44. When connected to the charging port 32, the second power cable 44 delivers the DC power to the electrified vehicle 12 for charging the battery pack 24.

The battery system 36 may additionally include one or more contactors for controlling the power flow through the battery system 36. For example, in a non-limiting embodiment, a first contactor 68 is positioned within the wiring path 58 and a second contactor 70 is disposed within the wiring path 60. The contactors 68, 70 act similar to high voltage relays for switching supply currents within the battery system 36. The contactors 68, 70 are selectively actuated between open positions and closed positions to disconnect/connect the wiring paths 58, 60 from other portions of the circuit. The contactors 68, 70 are both shown in open positions in FIG. 3. Closing the contactors 68, 70 permits electrical power to be transferred over the wiring paths 58, 60. The position (i.e., open or closed) of each contactor 68, 70 will depend on the charging operating mode indicated by the setting switch 56.

The battery system 36 includes a third contactor 75 positioned within the wiring path 62. The third contactor 75 is selectively closed to allow DC power to move from the battery array 52 to the second power cable 44. The third contactor 75 is opened during AC charging operating mode.

The transformer/converter 57 is positioned between the first power cable 42 and the wiring paths 58, 60 and is adapted to convert input AC voltage into DC voltage that can be accepted by the battery array 52 for charging the battery cells 64. Although shown generically, the transformer/converter 57 includes all the circuitry necessary for performing AC-to-DC conversions. In a non-limiting embodiment, the transformer/converter 57 receives AC power from the first power cable 42, converts the AC power to DC power, and then transfers the DC power to the battery array 52 over the wiring path 60. The AC-to-DC power conversion is not performed by the transformer/converter 57 if only AC power is desired.

The controller 54 of the battery system 36 performs multiple functions. The controller 54 is equipped with executable instructions for interfacing with and commanding operation of various components of the battery system 36. For example, in one non-limiting embodiment, the controller 54 communicates with each of the transformer/converter 57, the contactors 68, 70, the battery array 52, and the setting switch 56 over a controller area network (CAN) to control operation of the battery system 36. The controller 54 may be equipped with a processing unit and non-transitory memory for executing the various charging operating modes of the battery system 36. One exemplary control strategy is discussed below with reference to FIG. 5.

A first exemplary function of the controller 54 is to detect which charging operating mode has been selected by the user via the setting switch 56. For example, the controller 54 may detect whether an AC charging operating mode, a DC fast charging operating mode, a modified DC fast charging operating mode with cell replenishment, or a combined AC/DC charging operating mode has been selected based on a position of the actuator 66 of the setting switch 56. Each of these charging operating modes is discussed in greater detail with reference to FIGS. 4A through 4D.

Another exemplary function of the controller 54 is to control the transformer/converter 57 to convert AC power to DC power, such as when it is desirable to charge the battery cells 64. However, if the AC charging operating mode has been selected, the transformer/converter 57 will not convert the AC power to DC power and simply allows the AC power to be transferred over the wiring path 58. If, however, one of the DC charging operating modes has been selected, the controller 54 commands the transformer/converter 57 to convert the AC power to DC power and allows the DC power to be sent to the battery array 52 over the wiring path 60. In yet another embodiment, the controller 54 controls the contactors 68, 70 between the open and closed positions to control the power flow through the battery system 36.

The controller 54 may additionally monitor the battery cells 64 of the battery array 52. For example, the controller 54 may monitor the state of charge (SOC) of each battery cell 64, among many other battery parameters. In yet another non-limiting embodiment, the controller 54 can automatically command recharging of the battery cells 64 when the SOC of the battery array 52 falls below a predefined threshold.

Yet another exemplary function of the controller 54 is to communicate with a dedicated control system of the electrified vehicle 12 when the battery system 36 is connected to the electrified vehicle 12. In a first non-limiting embodiment, the controller 54 communicates with the control system of the electrified vehicle 12 to determine the SOC of the battery pack 24. For example, the controller 54 and the control system of the electrified vehicle 12 can communicate with one another to charge the battery array 52 and/or the battery pack 24 only during off-peak conditions of the grid power source 48. In yet another non-limiting embodiment, the controller 54, the electrified vehicle 12, and the grid power source 48 communicate with one another via power line communications (PLC).

FIGS. 4A-4D, with continued reference to FIGS. 1-3, schematically illustrate various charging operating modes of the battery system 36. In a non-limiting embodiment, a user/operator may select each charging operating mode using the setting switch 56 of the battery system 36.

FIG. 4A depicts an AC charging operating mode of the battery system 36. In the AC charging operating mode, the controller 54 commands the first contactor 68 closed and the second and third contactors 70, 75 open so that power from the grid power source 48 is only transferred over the wiring path 58. The wiring path 58 establishes a direct path P1 (schematically illustrated by a thickened arrow in FIG. 4A) between the grid power source 48 and the electrified vehicle 12 during the AC charging operating mode in order to charge the battery pack 24 using AC power only.

FIG. 4B depicts a DC fast charging operating mode of the battery system 36. In the DC fast charging operating mode, the controller 54 commands both contactors 68 and 70 open so that power is not transferred over either the wiring path 58 or the wiring path 60. The controller 54 then commands the third contactor 75 closed so that DC power stored on the battery array 52 is sent directly from the battery array 52 to the electrified vehicle 12 over the second power cable 44. The wiring path 62 establishes a direct path P2 (schematically illustrated by a thickened arrow in FIG. 4B) between the battery array 52 and the electrified vehicle 12 during the DC fast charging operating mode in order to charge the battery pack 24 using DC power only.

FIG. 4C depicts a modified DC fast charging operating mode of the battery system 36. In this operating mode, the battery cells 64 of the battery array 52 can be recharged at the same time the battery system 36 is employed to charge the battery pack 24 of the electrified vehicle 12. In operation, the controller 54 commands the contactor 68 open and the contactors 70, 75 closed so that power received from the first power cable 42 may only be communicated over the wiring path 60. The controller 54 also commands the transformer/converter 57 to convert AC power to DC power for charging the battery cells 64 of the battery array 52. The wiring path 60 thus establishes a path P3 (schematically illustrated by a thickened arrow in FIG. 4C) for transferring the DC power to the battery array 52.

The controller 54 may simultaneously command DC power that is stored within the battery cells 64 of the battery array 52 to be sent directly from the battery array 52 to the electrified vehicle 12 via the second power cable 44. The wiring path 62 establishes a direct path P4 between the battery array 52 and the electrified vehicle 12 during this operating mode to charge the cells of the battery pack 24 using DC power.

FIG. 4D depicts a combined AC/DC charging operating mode of the battery system 36. In operation, the controller 54 commands the contactor 68 closed and the contactor 70 may either be opened or closed (e.g., depending on whether the battery cells 64 of the battery array 52 require charging) so that power received from the first power cable 42 may be communicated over the wiring path 58 or, optionally, over both the wiring path 58 and the wiring path 60. The controller 54 may simultaneously command the contactor 75 closed so that DC power that is stored within the battery cells 64 of the battery array 52 is sent directly from the battery array 52 to the electrified vehicle 12 via the second power cable 44. In this way, the battery pack 24 is charged using both AC and DC power. During this operating mode, the wiring path 58 establishes a direct path P5 (see thickened arrow) between the grid power source 48 and the electrified vehicle 12, the wiring path 60 optionally establishes a path P6 (see thickened arrow) for recharging the battery cells 64 of the battery array 52, and the wiring path 62 establishes another direct path P7 between the battery array 52 and the electrified vehicle 12 for charging the cells of the battery pack 24.

Figure 5:
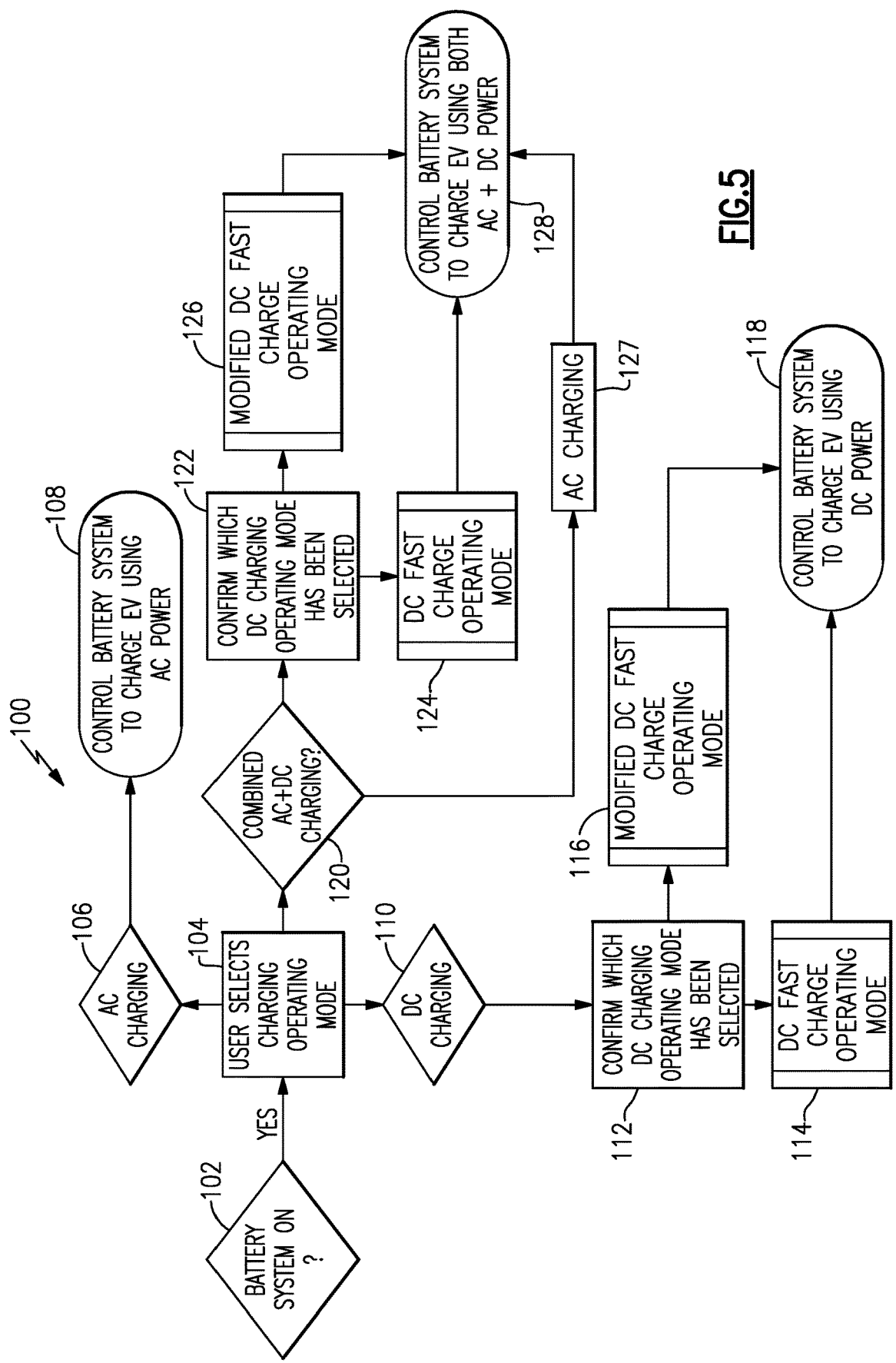
FIG. 5 schematically illustrates a control strategy for charging an electrified vehicle using the battery system of FIG. 3.

FIG. 5, with continued reference to the foregoing figures, schematically illustrates a control strategy 100 for charging the battery pack 24 of the electrified vehicle 12 using the battery system 36. The control strategy 100 begins at block 102 by confirming that the battery system 36 has been turned ON. At block 104, the user selects one of the charging operating modes of the battery system 36. For example, the user may select either the AC charging operating mode, the DC fast charging operating mode, the modified DC fast charging operating mode with cell replenishment, or the combined AC/DC charging operating mode. The setting switch 56 can be used to select the desired charging operating mode.

If the AC charging operating mode has been selected, as schematically shown at block 106, the control strategy 100 proceeds to block 108 and the battery system 36 is controlled as shown in FIG. 4A to charge the battery pack 24 of the electrified vehicle 12 using AC power.

Alternatively, if one of the DC operating modes has been selected, as shown schematically at block 110, the control strategy proceed to block 112 and confirms whether the DC fast charging operating mode of FIG. 4B has been selected (see block 114) or the modified DC fast charging mode of FIG. 4C has been selected (see block 116). The battery cells 64 of the battery array 52 are charged if the modified DC fast charging mode has been selected but are not charged otherwise. At block 118, the battery system 36 is controlled as shown in either FIG. 4B or FIG. 4C to charge the battery pack of the electrified vehicle 12 using DC power.

In yet another non-limiting embodiment, if the user selects the combined AC/DC charging operating mode of the battery system 36, as schematically shown at block 120, the control strategy 100 proceeds to block 122 and confirms which type of DC fast changing is desired. The DC fast charging operating mode of FIG. 4B is schematically shown at block 124 and the modified DC fast charging mode of FIG. 4C is schematically shown at block 126. In other words, the combined AC/DC charging operating mode may utilize the DC fast charging operating mode of either FIG. 4B or FIG. 4C. AC charging is shown schematically at block 127. Finally, at block 128, the battery system 36 is controlled such as shown in FIG. 4D to charge the battery pack 24 of the electrified vehicle 12 using both AC and DC power.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery system, comprising:
   a housing;
   a battery array inside said housing;
   a first wiring path that bypasses said battery array and establishes a direct path for transferring AC originated power for charging a battery pack of an electrified vehicle;
   a second wiring path electrically connected to said battery array and that establishes a direct path for transferring DC power for charging said battery array; and
   a transformer/converter housed inside said housing and configured to convert AC power from a grid power source to DC power for charging a plurality of battery cells of said battery array.

2. The battery system as recited in claim 1, comprising a third wiring path that extends between said battery array and a power cable of said battery system.

3. The battery system as recited in claim 2, wherein said third wiring path establishes a direct path for transferring DC power for charging said battery pack.

4. The battery system as recited in claim 1, comprising a setting switch having an actuator movable to select from a plurality of charging operating modes of said battery system.

5. The battery system as recited in claim 4, wherein said plurality of charging operating modes include an AC charging operating mode, a DC fast charging operating mode, and a combined AC/DC charging operating mode.

6. The battery system as recited in claim 1, comprising a first contactor disposed in said first wiring path and a second contactor disposed in said second wiring path.

7. The battery system as recited in claim 1, comprising a controller configured to control operation of said battery system.

8. The battery system as recited in claim 7, wherein said controller is configured to selectively command DC power to be sent to said battery array over said second wiring path.

9. The battery system as recited in claim 8, wherein said controller is configured to close a contactor to send said DC power to said battery array over said second wiring path.

10. The battery system as recited in claim 1, comprising a first power cable and a second power cable that extend to outside of said housing.

11. The battery system as recited in claim 1, wherein said battery array includes a plurality of battery cells that store energy for charging a battery pack separate from said battery system.

12. A method, comprising:
    charging the battery pack of the electrified vehicle with the battery system of claim 1, the battery system adapted to charge the battery pack using the AC originated power, the DC power, or both,
    wherein the battery system includes the housing, the battery array, and a setting switch mounted to and accessible at an exterior of the housing and configured for selecting whether the battery pack is charged using the AC originated power, the DC power, or both.

13. The method as recited in claim 12, comprising:
    connecting the battery system to a grid power source;
    storing energy within the battery array of the battery system; and
    using the energy stored in the battery array to charge the battery pack.

14. The method as recited in claim 12, comprising:
    selecting on the setting switch a charging operating mode for charging the battery pack with the battery system.

15. The method as recited in claim 14, wherein, if an AC charging operating mode of the battery system has been selected, the method includes:
    charging the battery pack using only the AC originated power.

16. The method as recited in claim 14, wherein, if a DC fast charging operating mode of the battery system has been selected, the method includes:
    charging the battery pack using only the DC power.

17. The method as recited in claim 16, comprising:
    simultaneously charging the plurality of battery cells of the battery array of the battery system.

18. The method as recited in claim 14, wherein, if a combined AC/DC charging operating mode of the battery system has been selected, the method includes:
    charging the battery pack using both the AC originated power and the DC power.

19. The method as recited in claim 18, comprising:
    simultaneously charging the plurality of the battery cells of the battery array of the battery system.

20. A battery system, comprising:
    a housing;
    a battery array positioned inside said housing;
    a first wiring path extending from a grid power source, through a first power cable extending from said housing, through said housing, and then through a second power cable extending from said housing for transferring AC originated power to a battery pack of an electrified vehicle, wherein the first wiring path bypasses the battery array;
    a second wiring path extending from said grid power source, through said first power cable, and then through a transformer/converter located inside said housing for transferring DC power for charging said battery array;
    a third wiring path that extends from said battery array, through said housing, and then to said second power cable for establishing a direct path for transferring DC power for charging said battery pack; and
    a setting switch mounted to an exterior of said housing and including a toggle, button, or knob that is actuable to a first position to select said first wiring path for transferring said AC originated power, actuable to a second position to select said second wiring path for transferring said DC power, actuable to a third position to select said third wiring path for transferring said DC power, and actuable to a fourth position to select both said first wiring path and said second wiring path for simultaneously transferring both said AC originated power and said DC power.

* * * * *